US012084892B2

(12) United States Patent
Hege et al.

(10) Patent No.: US 12,084,892 B2
(45) Date of Patent: Sep. 10, 2024

(54) AUTOMATIC BLOCKING DEVICE FOR LIMITING A SLIDING MOVEMENT OF A FIRST STRUCTURE MOUNTED ADJACENT TO A SECOND STRUCTURE

(71) Applicant: A. G. Stacker Inc., Weyers Cave, VA (US)

(72) Inventors: Dalton Hege, Weyers Cave, VA (US); Jerry Blosser, Crimora, VA (US); Eric Stempihar, Rockingham, VA (US); Kennedy Sullivan Larramore, Staunton, VA (US); Randall Donn Senger, Mount Sidney, VA (US); Joseph Wunder, Lexington, VA (US)

(73) Assignee: A.G. STACKER INC., Weyers Cave, VA (US)

( * ) Notice: Subject to any disclaimer, the term of this patent is extended or adjusted under 35 U.S.C. 154(b) by 114 days.

(21) Appl. No.: 17/719,816

(22) Filed: Apr. 13, 2022

(65) Prior Publication Data

US 2022/0412124 A1 Dec. 29, 2022

Related U.S. Application Data

(60) Provisional application No. 63/182,875, filed on May 1, 2021.

(51) Int. Cl.
*E05B 47/00* (2006.01)
*E05B 63/22* (2006.01)
*E05B 65/00* (2006.01)

(52) U.S. Cl.
CPC ............ *E05B 47/004* (2013.01); *E05B 65/00* (2013.01); *E05B 63/22* (2013.01); *E05B 65/0021* (2013.01)

(58) Field of Classification Search
CPC .... E05B 47/004; E05B 65/00; E05B 65/0021; E05B 47/023; E05B 63/0052;
(Continued)

(56) References Cited

U.S. PATENT DOCUMENTS 2,181,313 A * 11/1939 Blodgett ............ E05B 65/0021
292/210
2,660,765 A * 12/1953 Carlson ............ E05B 65/0021
292/DIG. 36
(Continued)

FOREIGN PATENT DOCUMENTS

CN 203665353 U 6/2014
EP 1679456 A1 7/2006
(Continued)

*Primary Examiner* — Christine M Mills
*Assistant Examiner* — Faria F Ahmad
(74) *Attorney, Agent, or Firm* — J-TEK LAW PLLC; Jeffrey D. Tekanic; Scott T. Wakeman

(57) ABSTRACT

A lockout device for selectively blocking linear movement of a movable frame member relative to a fixed frame member includes a lock tab pivotably mountable to the fixed frame member and having a contact surface configured to slidably engage a slide surface of the movable frame member when the lock tab has a first orientation, the movable frame member including a stop surface at one end of the slide surface, a holder for releasably holding the lock tab in a second orientation with the contact surface spaced from the slide surface, and a body mountable to the movable frame member and configured such that movement of the movable frame member in a first direction causes the body pivot the lock tab into the second orientation and movement of the movable member in a second direction causes the body to pivot the lock tab into the first orientation.

20 Claims, 7 Drawing Sheets

(58) Field of Classification Search
CPC ........ E05B 63/22; E05C 19/02; E05C 19/024; E05C 19/028; Y10T 292/0883; Y10T 292/0814; Y10T 292/0876
See application file for complete search history.

(56) References Cited

U.S. PATENT DOCUMENTS

| | | | | |
|---|---|---|---|---|
| 3,325,203 | A * | 6/1967 | Moler | E05B 47/0047 |
| | | | | 292/201 |
| 3,788,678 | A * | 1/1974 | Switzgable | E05C 9/043 |
| | | | | 292/306 |
| 3,838,877 | A * | 10/1974 | Hanson | E05B 65/0021 |
| | | | | 292/DIG. 36 |
| 3,863,965 | A * | 2/1975 | Vickers | E05C 5/00 |
| | | | | 292/DIG. 55 |
| 3,918,278 | A * | 11/1975 | Spear | A61G 12/001 |
| | | | | 70/58 |
| 3,924,884 | A * | 12/1975 | Christie | E05C 3/16 |
| | | | | 292/196 |
| 4,782,674 | A * | 11/1988 | Johnson | E05C 3/16 |
| | | | | 70/95 |
| 5,022,691 | A * | 6/1991 | Clay, Jr. | E05C 3/30 |
| | | | | 292/121 |
| 5,602,526 | A * | 2/1997 | Read | B60Q 3/30 |
| | | | | 116/28 R |
| 5,704,663 | A * | 1/1998 | Clay, Jr. | E05C 3/124 |
| | | | | 292/DIG. 32 |
| 5,720,333 | A * | 2/1998 | Turvey | E06B 9/86 |
| | | | | 160/310 |
| 5,931,033 | A * | 8/1999 | Lanigan | E05B 83/12 |
| | | | | 70/451 |
| 6,047,576 | A * | 4/2000 | Lanigan | E05B 65/0021 |
| | | | | 70/279.1 |
| 6,085,825 | A * | 7/2000 | Swink | E05F 15/67 |
| | | | | 160/133 |
| 6,089,626 | A * | 7/2000 | Shoemaker | E05B 65/0021 |
| | | | | 292/201 |
| 6,094,865 | A * | 8/2000 | Weeks | E06B 9/80 |
| | | | | 292/DIG. 36 |
| 6,427,749 | B1 * | 8/2002 | Swink | E05F 15/67 |
| | | | | 160/133 |
| 6,659,516 | B2 | 12/2003 | Wang et al. | |
| 6,834,464 | B2 * | 12/2004 | Shoemaker | E05B 65/0021 |
| | | | | 292/DIG. 36 |
| 7,114,753 | B2 * | 10/2006 | Nodorft | E05B 65/0021 |
| | | | | 292/145 |
| 7,405,927 | B2 | 7/2008 | Lev | |
| 7,861,839 | B2 | 1/2011 | Schweiher et al. | |
| 7,950,439 | B2 | 5/2011 | Anderson | |
| 8,009,424 | B2 | 8/2011 | Zhu et al. | |
| 8,172,282 | B2 | 5/2012 | Lev et al. | |
| 8,245,549 | B2 * | 8/2012 | Zagoroff | E05B 83/12 |
| | | | | 292/201 |
| 8,459,433 | B2 | 6/2013 | Völz et al. | |
| 8,757,677 | B2 * | 6/2014 | Wintersteiger | E05B 47/0607 |
| | | | | 292/201 |
| 8,827,332 | B2 * | 9/2014 | Balay | E05B 47/0603 |
| | | | | 292/341.15 |
| 9,238,452 | B2 | 1/2016 | Hyde et al. | |
| 9,777,512 | B2 * | 10/2017 | Curtis | E05B 63/0052 |
| 10,377,353 | B2 | 8/2019 | Spaulding et al. | |
| 10,935,131 | B2 | 3/2021 | Nofzinger et al. | |
| 11,746,571 | B2 * | 9/2023 | Hunt | E05B 81/18 |
| | | | | 292/201 |
| 2004/0212197 | A1 * | 10/2004 | Shoemaker | E05B 65/0847 |
| | | | | 292/216 |
| 2008/0277236 | A1 | 11/2008 | Ruhringer et al. | |
| 2013/0056995 | A1 * | 3/2013 | Hudson | E05B 65/0882 |
| | | | | 292/181 |
| 2013/0088025 | A1 * | 4/2013 | Balay | E05B 47/0603 |
| | | | | 292/341.17 |
| 2013/0247627 | A1 * | 9/2013 | Szczygielski | E05C 3/045 |
| | | | | 70/431 |
| 2014/0265356 | A1 * | 9/2014 | Tsai | E05C 19/02 |
| | | | | 292/99 |
| 2014/0366595 | A1 * | 12/2014 | Header | E05B 1/003 |
| | | | | 292/336.3 |
| 2015/0061300 | A1 * | 3/2015 | Hudson | E05D 15/16 |
| | | | | 292/164 |
| 2017/0067271 | A1 * | 3/2017 | Schroeder | E05B 15/0295 |
| 2018/0266035 | A1 * | 9/2018 | Wang | E05B 47/004 |
| 2018/0363328 | A1 * | 12/2018 | Huang | E05B 47/004 |
| 2018/0368652 | A1 * | 12/2018 | Krieger | E05C 19/009 |

FOREIGN PATENT DOCUMENTS

| | | |
|---|---|---|
| KR | 101281880 B1 | 7/2013 |
| WO | 2019001642 A1 | 1/2019 |

* cited by examiner

AUTOMATIC BLOCKING DEVICE FOR LIMITING A SLIDING MOVEMENT OF A FIRST STRUCTURE MOUNTED ADJACENT TO A SECOND STRUCTURE

CROSS-REFERENCE

The present application claims the benefit of U.S. provisional patent application No. 63/182,875 filed May 1, 2021, the entire contents of which are hereby incorporated by reference.

TECHNICAL FIELD

The present disclosure is directed to a blocking device for limiting sliding movement of a first structure relative to a second structure, and, more specifically, to a blocking device for limiting sliding movement of a first structure relative to a second structure which blocking device operates automatically and without electronic control.

BACKGROUND

Many machines and mechanical devices include a first structure that is slidably mounted adjacent to a second structure. The movable structure can be moved, for example, by an electric motor or a hydraulic/pneumatic cylinder or manually by an operator or by other types of actuator. A typical machine may include a first movable structure that moves up and down relative to a second, stationary structure such as a portion of a frame. Examples of such machines include those having a vertically movable cutting or clamping element that moves repeatedly up and down relative to a support frame during normal machine operation. Machines may also include structures that slide horizontally back and forth relative to a fixed structure such as a portion of a frame. Examples of such machines include devices with piston-like pushing element that shift products across a horizontal surface. A first structure can also slide relative to a structure at an angle to the vertical.

It is sometimes desirable to prevent the movement of the movable structure, at least in one direction. In the case of a vertically movable structure, for example, it may be necessary to hold the movable structure in a raised position to allow an operator to inspect or maintain the machine or to remove a jam from the machine. In this case downward movement of the movable structure must be prevented to prevent injury to the operator.

Many types of locks are known for locking a movable structure relative to the fixed structure. For example, each of the structures can be provided with a through opening, and a bolt or pin can be inserted through the through openings when they are aligned in order to prevent movement of the moveable structure in either direction. Such locks can sometimes be difficult to lock and unlock, and it may not always be clear to an operator or maintenance person whether the lock is correctly installed.

It would therefore be desirable to provide a blocking device for securely preventing the sliding movement of one movable structure relative to another structure that is reliable, simple to operate and that can provide a visible indication as to whether the blocking device is in a blocking or a release configuration.

SUMMARY

These problems are addressed by embodiments of the disclosed invention, a first aspect of which comprises a lockout device for selectively blocking linear movement of a movable frame member relative to a fixed frame member. The lockout device includes a lock tab pivotably mountable to the fixed frame member adjacent to the movable frame member that has a contact surface configured to slidably engage a slide surface of the movable frame member when the lock tab has a first orientation. The movable frame member includes a stop surface at one end of the slide surface. The lockout device also includes a holding mechanism for releasably holding the lock tab in a second orientation with the contact surface spaced from the slide surface and a body mountable to the movable frame member and configured such that movement of the movable frame member in a first direction relative to the fixed frame member causes the body to contact a first portion of the lock tab and pivot the lock tab into the second orientation and such that movement of the movable member in a second direction relative to the fixed frame member causes the body to contact a second portion of the lock tab and pivot the lock tab into the first orientation.

Another aspect of the disclosure comprises a machine that has a fixed frame member, a movable frame member mounted for linear movement relative to the fixed frame member; and the lockout device described above. The lock tab is mounted to the fixed frame member adjacent to the movable frame member, and the body is mounted to the movable frame member.

A further aspect of the disclosure comprises an apparatus that includes a fixed frame member and a movable frame member mounted for linear movement relative to the fixed frame member in a first direction and a second direction. The movable frame member has a slide surface and a stop surface. The apparatus also includes a lockout device for selectively blocking the linear movement of the movable frame member in the second direction, and the lockout device includes a lock tab pivotably mounted to the fixed frame member at a location adjacent to the movable frame member. The lock tab has a first end, a contact surface at the first end, a second end, a first cam surface and a second cam surface. The lockout device also includes a body projecting from the movable frame member that is configured to move along a path as the movable frame member moves relative to the fixed frame member. The lock tab has a first orientation in which the first end contacts the slide surface and the second end is outside the path and a second orientation in which the first end contacts the stop surface and the second end is outside the path and a third orientation in which the first end is spaced from the movable frame member and the second end is in the path. Furthermore, the lock tab is configured such that moving the movable frame member in the first direction from a first position to a second position causes the lock tab to move from the first orientation to the second orientation, and moving the movable frame member from a third position to a fourth position causes the body to contact the first cam surface and shift the lock tab from the second orientation to the third orientation, and moving the movable frame member from the third position to the first position causes the body to contact the second cam surface and shift the lock tab from the third orientation to the first orientation.

Yet another aspect of the disclosure comprises a method of operating the above-described apparatus that includes reciprocating the movable frame member relative to the fixed frame member with the lock tab in the first orientation such that the contact surface slides on the slide surface in the second direction from a first location to a second location and in the first direction from the second location to the first location and, with the contact surface at the second location, moving the movable frame member in the first direction until an end of the slide surface moves past the first end of the lock tab to enable the lock tab to shift to the second orientation. The method also includes moving the movable frame member in the second direction until the movable frame member is supported by the lock tab.

BRIEF DESCRIPTION OF THE DRAWINGS

These and other aspects and features of the present disclosure will be better understood from a reading of the following detailed description in combination with the attached drawings wherein.

DETAILED DESCRIPTION

Figure 1:
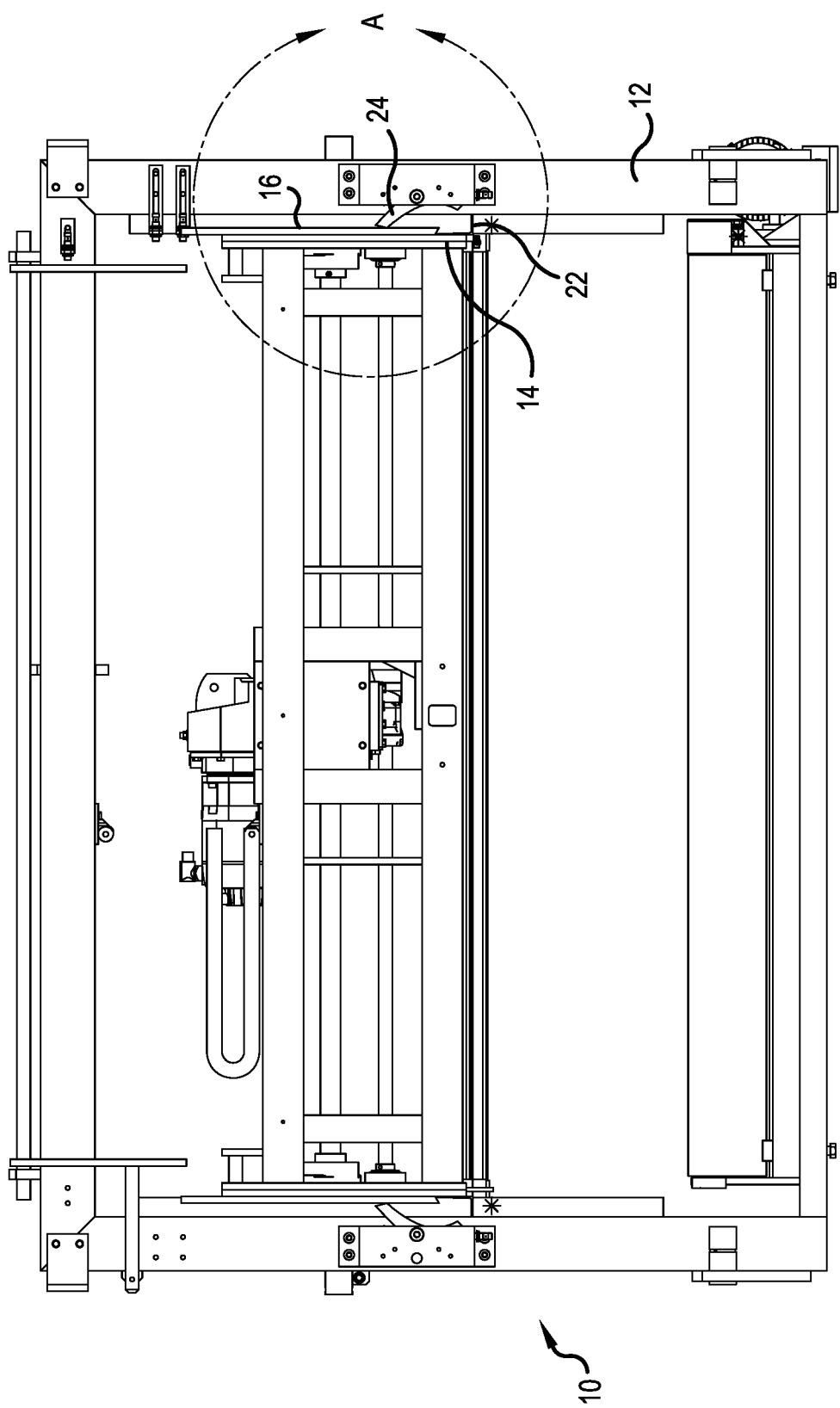
FIG. 1 is a front elevational view of a machine having a fixed frame member and a movable frame member and a blocking device according to an embodiment of the present disclosure.

FIG. 1 shows a machine 10, in this case, a bundle breaker, that includes a fixed frame member 12 and a movable frame member 14 that is supported for reciprocating vertical movement along the fixed frame member 12. The portion of the machine 10 located inside circle A is shown in greater detail in FIGS. 2-6.

The machine 10 includes a lock bar 16 that is mounted to the movable frame member 14. The lock bar 16 includes a slide surface 18 and a stop surface 19 at a bottom end of the lock bar 16 which in the present embodiment forms part of a notch 20. While the lock bar 16 is shown as an element that is attached to the movable frame member 14, the slide surface 18 and the stop surface 19 could alternately be formed directly on a portion of the movable frame member 14 itself without departing from the scope of the present disclosure. A body 22 is attached to the movable frame member 14 at a position below the stop surface 19, and the body 22 includes a plate-shaped projection 23 that extends from the movable frame member 14 perpendicular to the direction of travel of the movable frame member 14, in this case, horizontally.

Figure 2:
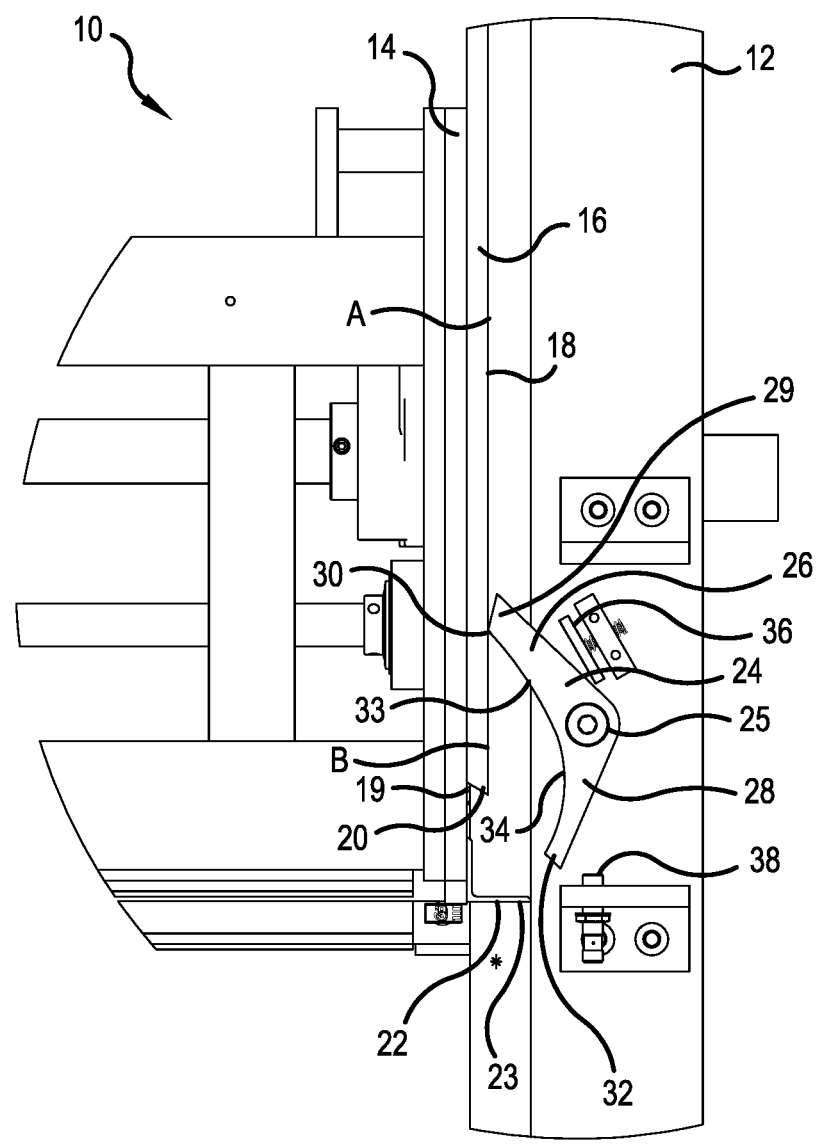
FIG. 2 is a side elevational view of a portion of the machine of FIG. 1 showing the movable frame member in a first position and the blocking device in a first orientation.

A lock tab 24 is pivotably mounted to a pivot pin 25 on the fixed frame member 12. The lock tab 24 is shaped somewhat like a boomerang with its concave side facing the movable frame member 14. The lock tab 24 includes an upper portion 26 above the pivot pin 25 that is longer and heavier than a lower portion 28 located below the pivot pin 25. Because the upper portion 26 is heavier than the lower portion 28, the greater weight of the upper portion 26 causes the lock tab 24 to pivot counterclockwise as shown in FIG. 2 until its movement is stopped by contact with the slide surface 18 of the lock bar 16. The lock tab 24 includes a first end 29 having a contact surface 30 that contacts the sliding surface 18 of the lock bar 16, a second end 32, a first cam surface 33 and a second cam surface 34. The weight distribution of the lock tab 24 tends to hold the contact surface 30 against the slide surface 18 and to bias the contact surface 30 toward the slide surface 18 when it is not in contact with the slide surface 18. The slide surface 18 and/or the contact surface 30 can be lubricated and/or provided with a low friction, wear resistant coating if desired. Alternately, the contact surface 30 can comprise the outer surface of a cylindrical roller (not illustrated) that rolls along the slide surface 18 in order to reduce wear between the lock tab 24 and the movable frame member 14.

A permanent magnet 36 is mounted on the fixed frame member 12 adjacent to the upper portion 26 of the lock tab 24 and in the present embodiment is connected to the fixed frame member 12 by a resilient member such as a spring 37. The permanent magnet is an example of a holding means according to the disclosure. The lock tab 24 is either made entirely from magnetic material, such as steel, or a magnet or a body of magnetic material is attached to the lock tab 24 at a location where it can come into contact with the magnet 36 when the lock tab 24 is pivoted against the magnet 36. In the alternative, the permanent magnet can be located on the lock tab 24 and a magnetic plate (not illustrated) can be provided on the fixed frame member 12 at a location where it can interact the a permanent magnet on the lock tab 24.

A locked out sensor 38 is mounted to the fixed frame member 12 beneath the lower portion 28 of the lock tab 24. The locked out sensor 38 may comprise a proximity sensor that electrically, magnetically and/or physically detects the presence of the second end 32 of the lock tab 24 at a location near the locked out sensor 38 and produce an electrical, audible and/or optical output signal to indicate that the lock tab 24 is in a locking position.

During normal operation of the machine 10, the movable frame member 14 slides in a first direction (up) and a second direction (down) relative to the fixed frame member 12 so that the contact surface 30 of the lock tab 24 moves generally between points A and B (in FIG. 2) on the slide surface 18. This orientation of the lock tab 24 during this normal operation may be referred to as a first orientation. During normal operation, the lock tab 24 does not affect the operation of the machine 10.

Figure 3:
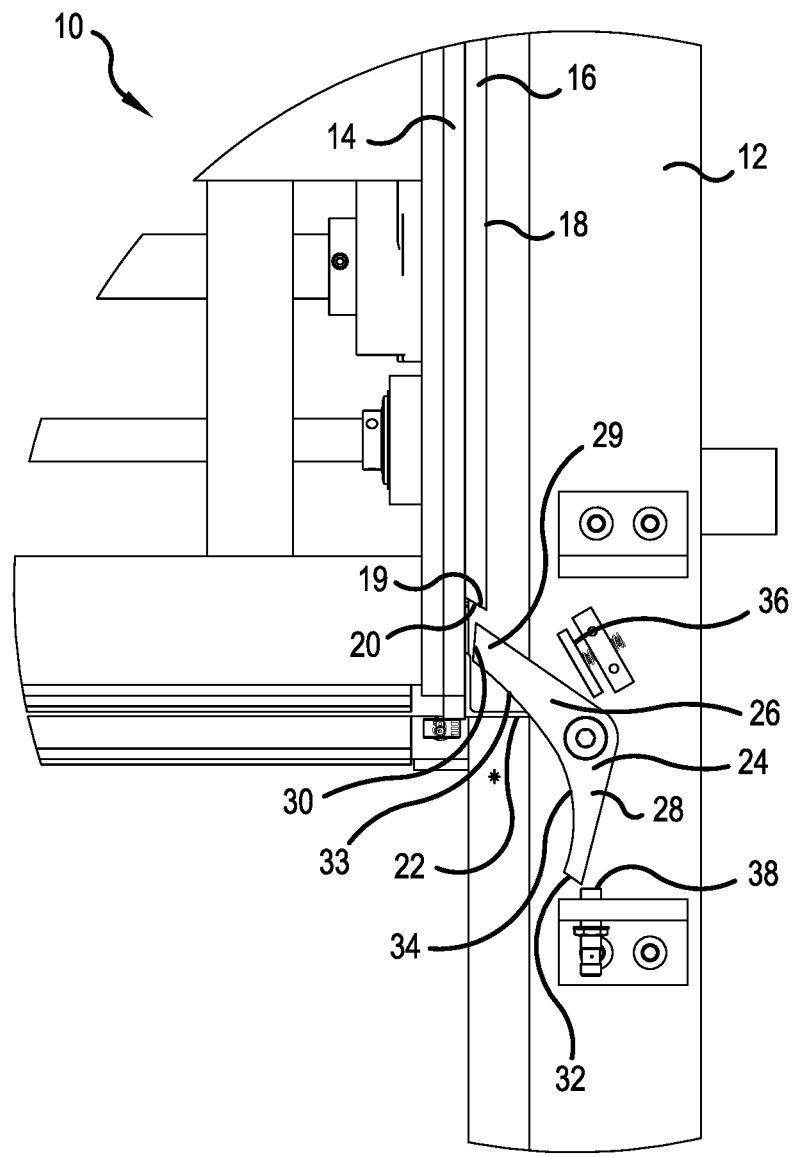
FIG. 3 is a side elevational view of a portion of the machine of FIG. 1 showing the movable frame member in a second position and the blocking device in a second orientation.

FIG. 3 illustrates the first step of securing the movable frame member 14 in a raised position relative to the fixed frame member 12. The movable frame member 14 is raised, either manually or by a special operation of the drive that raises and lowers the movable frame member 14 during normal operation, to a position such that the bottom notch 20 of the lock bar 16 is located above the first end 29 of the lock tab 24. In this position, the weight of the upper portion 26 of the lock tab 24 causes the lock tab 24 to pivot counterclockwise (under the force of gravity) until the contact surface 30 of the lock tab 24 falls against and contacts a side of the movable member 14 (that may also be considered a stop), and the first end 29 of the lock tab 24 is located beneath the stop surface 19 at the bottom end of the lock bar 16. This may be referred to as a second orientation of the lock tab 24.

Figure 4:
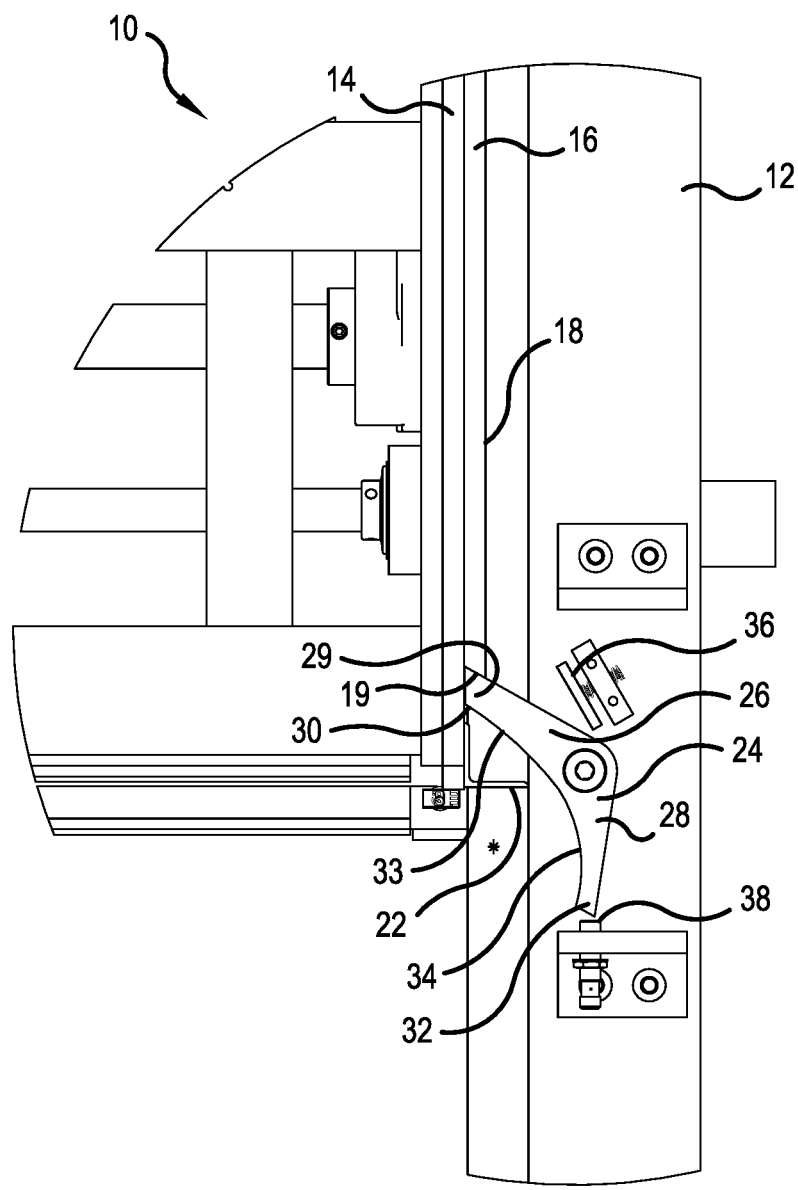
FIG. 4 is a side elevational view of a portion of the machine of FIG. 1 showing the movable frame member in a third position and the blocking device in the second orientation.

As shown in FIG. 4, the movable frame member 14 is then lowered until the first end 29 of the lock tab 24 enters the bottom notch 20 of the lock bar 16. The weight of the movable frame member 14 pressing against the lock tab 24 holds the lock tab 24 in place, and the attachment of the lock tab 24 to the fixed frame member 12 prevents downward movement of the movable frame member 14. That is, the lock tab 24 is constructed to support the weight of the movable frame member 14 in this raised position. Advantageously, the lock tab 24 passively falls into the position shown in FIG. 4, and no additional control mechanism is required to shift the lock tab 24 to this orientation. Furthermore, no energy is required to hold the lock tab 24 in position, and the lock tab 24 will remain in position supporting the movable frame member 14 until energy is expended to lift the movable frame member 14 away from the lock tab 24. This provides a reliable, passive, safety mechanism for holding the movable frame member 14 in a raised and locked position. For additional security, the lock tab 24 can optionally be locked in the third orientation with a pin, padlock or other mechanism to prevent the lock tab 24 from being released.

In this blocked position, the second end 32 of the lock tab 24 is aligned with the locked out switch 38. The locked out switch 38 includes a sensor that detects the proximity of the lock out tab 24 and generate a signal that can be sent to a controller (not illustrated) or used to illuminate a light or otherwise indicate that the lock tab 24 is in the locking (or blocking) position. Note that the plate shaped projection 23 of the body 22 is spaced from the first cam surface 33 and from the second cam surface 34 of the lock tab 24 in this position.

Figure 5:
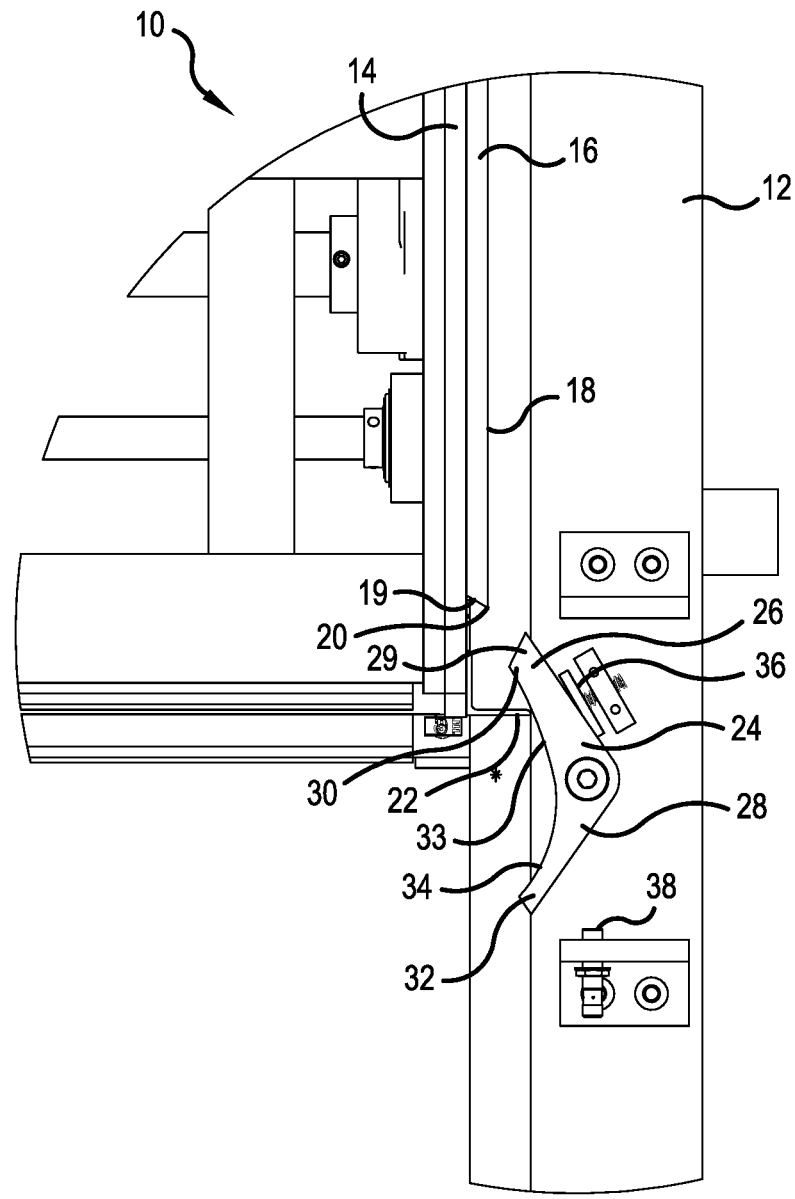
FIG. 5 is a side elevational view of a portion of the machine of FIG. 1 showing the movable frame member in a fourth position and the blocking device in a third orientation.

To release the movable frame member 14 in order to resume normal operation of the machine 10, the movable frame member 14 is raised as shown in FIG. 5 such that the plate-shaped projection 23 contacts the first cam surface 33 of the lock tab 24, and as the movable frame member 14 is raised further, the plate-shaped projection 23 pushes against the first cam surface 33 and pivots the lock tab 24 clockwise until the upper portion 26 of the lock tab 24 contacts the magnet 36. The magnet 36 secures the lock tab 24 in this position with the contact surface 30 of the lock tab 24 spaced from the lock bar 16. This may be referred to as a third orientation of the lock tab 24.

Figure 6:
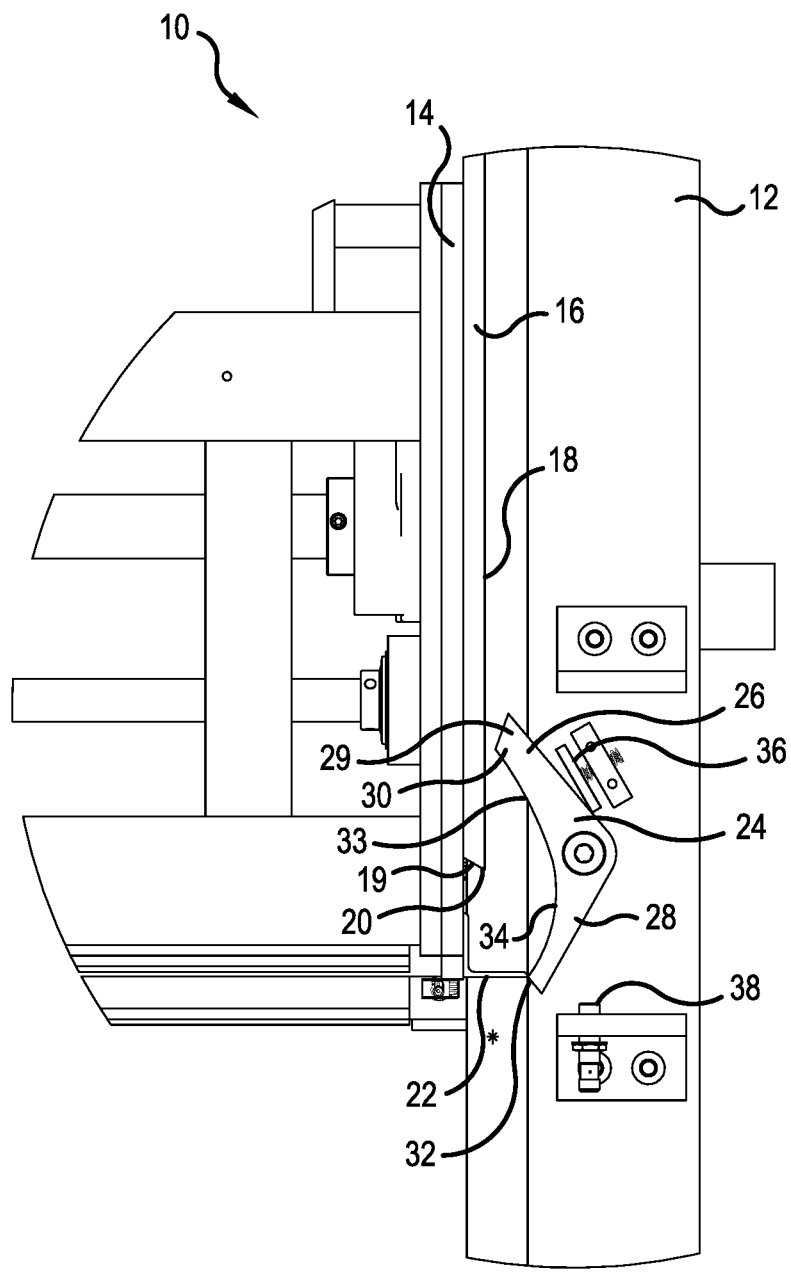
FIG. 6 is a side elevational view of a portion of the machine of FIG. 1 showing the movable frame member in a fifth position and the blocking device shifting from the third orientation to the first orientation.

The movable frame member 14 is then lowered from the position illustrated in FIG. 5 to the position illustrated in FIG. 6. After the bottom notch 20 of the lock bar 16 has been lowered to a location below the contact surface 30 of the lock tab 24, the plate-shaped projection 23 of the body 22 contacts the second cam surface 34 of the lock tab 24 and pushes the lock tab 24 so that it pivots counterclockwise to pull the upper portion 26 of the lock tab 24 away from the magnet 36. With the contact surface 30 once again in contact with the slide surface 18 of the lock bar 16, normal operation of the machine 10 can be resumed.

Figure 7:
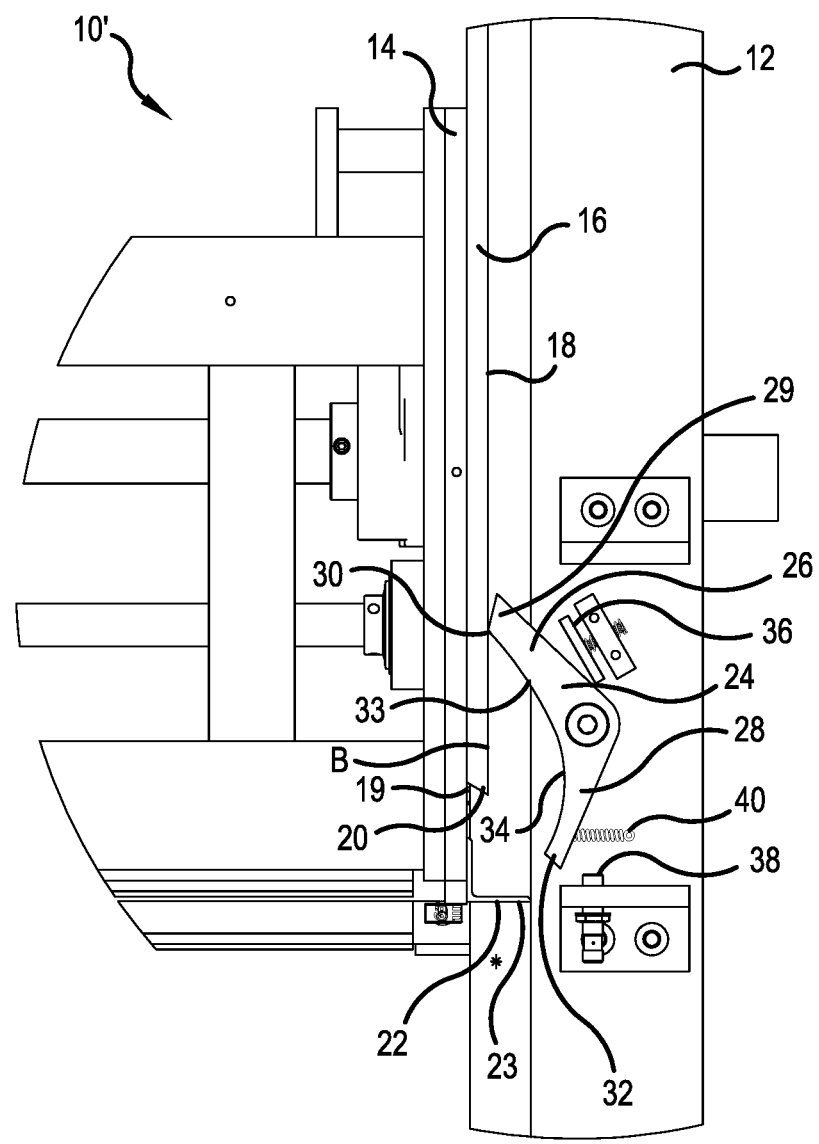
FIG. 7 is a side elevational view of a portion of the machine of FIG. 1 showing the movable frame member in the first position and an alternate embodiment of the blocking device in the first orientation.

FIG. 7 illustrates a modification of the machine of FIG. 1. In this embodiment, a spring 40 is provide to rotationally bias the lock tab 24 counterclockwise to press the contact surface 30 against the lock bar 16. A torsion spring (not illustrated) can be mounted at the pivot point of the lock tab 24 to perform the same function as the spring 40. The spring 40 allows the above blocking function to be performed and the contact surface 30 to remain in contact with the lock bar 16 even if the movable member 14 slides horizontally or at an angle to vertical. This can be useful if the mechanism needs to be vertically inverted, installed horizontally, or applied at any angle in order to meet the specific needs of the machine on which it is to be installed. The pulling force of the spring must be sufficient to overcome the pull of gravity on the lock tab and hold the lock tab 24 against the slide surface 18, but not so great as to prevent the magnet 36 from holding the lock tab 24 in the third orientation when needed.

This disclosed blocking arrangement uses no actuators other than the prime mover already used for raising and lowering the movable frame member 14 of the machine 10 during normal operation. Furthermore, if the machine 10 includes a servo axis that provides position feedback, it becomes easier to automate the movement of the movable frame member 14 as discussed above. However, position feedback is not required to provide the above-described blocking function.

Multiple lock tabs 24 could be provided to establish multiple blocking positions if required, for example, if the movable frame element 14 moves a significant distance along the fixed frame element and it is desired to be able to block the moveable frame element at more than one location.

The permanent magnet 36 discussed above is an example of a holding means for maintaining an orientation of the lock tab 24. As used herein, "holding means" should be understood to comprise any element or structure that maintains the lock tab 24 in an orientation with the contact surface 30 spaced from the slide surface 18 and releases the lock tab 24 when a force is applied to the lock tab 24 to rotate the lock tab 24 counterclockwise. The holding means could be an electromagnet used in place of the permanent magnet 36 discussed above; however, preferably, the holding means is passive and does not require electrical or pneumatic actuation to move among the various orientations discussed above. Such holding means could include, without limitation, suction devices, adhesives, hook-and-loop fasteners, ball detents, and structures for frictionally engaging the lock tab 24 to hold it in position. For example, a sheet of elastomeric material could be provided between the upper portion 26 of the lock tab 24 and the fixed machine element 12 so that the portion of the lock tab 24 that faces the fixed machine element 12 overlap and frictionally engage the elastomeric material when the lock tab 24 pivots clockwise in FIG. 2 to hold the lock tab 24 with a press fit. The holding means can also be located between the pivot pin 25 and the opening in the lock tab 24 that receives the pivot pin 25 and comprise a ball detent or other suitable detent mechanism for maintaining a position of one rotatable member relative to another. The holding means could also comprise a friction fit between the pivot pin 25 and the opening in the lock tab 24 that receives the pivot pin which friction fit prevents the lock tab 24 from pivoting under its own weight toward the slide surface over a first angular range and allows free pivoting movement between the lock tab 24 and the pivot pin 25 over other angular ranges.

The present invention has been described above in terms of presently preferred embodiments. However, modifications and additions to these embodiments will become apparent to persons of ordinary skill in the art upon a reading of the foregoing disclosure. For example the specific mechanism shown in the attached drawings is designed to provide an automatic position holding apparatus for a linear, vertical axis of motion. The apparatus can also operate to secure horizontally slidable objects or objects that slide at an angle to the vertical. The operation of the apparatus in such alternate environments will readily be appreciated by persons of ordinary skill in the art based on the foregoing description of the blocking mechanism used to secure a structure that is vertically slidably mounted relative to a second structure. It is intended that all such modifications and additions form a part of the present invention to the extent they fall within the scope of the several claims appended hereto.

What is claimed is:

1. A lockout device for selectively blocking linear movement of a movable frame member relative to a fixed frame member, the lockout device comprising:
 a lock tab pivotably mountable to the fixed frame member adjacent to the movable frame member and having a contact surface configured to slidably engage a slide surface of the movable frame member when the lock tab has a first orientation, the movable frame member including a stop surface at one end of the slide surface;
 holding means for releasably holding the lock tab in a second orientation with the contact surface spaced from the slide surface; and
 a body mountable to the movable frame member and configured such that movement of the movable frame member in a first direction relative to the fixed frame member causes the body to contact a first portion of the lock tab and pivot the lock tab into the second orientation and movement of the movable member in a second direction relative to the fixed frame member causes the body to contact a second portion of the lock tab and pivot the lock tab into the first orientation,
 wherein the lock tab has a third orientation in which an end of the lock tab contacts the stop surface to prevent movement of the movable member in the second direction.

2. The lockout device according to claim 1,
 wherein the holding means comprises a permanent magnet.

3. The lockout device according to claim 2,
 wherein the permanent magnet is mounted on the fixed frame member.

4. The lockout device according to claim 3,
 including a lock bar mountable to the movable frame member, the slide surface being formed on the lock bar and the stop surface being at least partially defined by an end of the lock bar.

5. The lockout device according to claim 4,
 wherein the body is attachable to the movable member at a location such that the stop surface is located between the body and the slide surface,
 wherein the first portion of the lock tab includes a first cam surface and the second portion of the lock tab includes a second cam surface, and
 wherein the body includes a projection configured to interact with the first and second cam surfaces.

6. A machine comprising:
 a fixed frame member;
 a movable frame member mounted for linear movement relative to the fixed frame member; and
 the lockout device according to claim 1,
 wherein the lock tab is mounted to the fixed frame member adjacent to the movable frame member, and
 wherein the body is mounted to the movable frame member.

7. An apparatus comprising:
 a fixed frame member;
 a movable frame member mounted for linear movement relative to the fixed frame member in a first direction and a second direction, the movable frame member having a slide surface and a stop surface,
 a lockout device for selectively blocking the linear movement of the movable frame member in the second direction, the lockout device comprising:
 a lock tab pivotably mounted to the fixed frame member at a location adjacent to the movable frame member, the lock tab having a first end, a contact surface at the first end, a second end, a first cam surface and a second cam surface, and
 a body projecting from the movable frame member and configured to move along a path as the movable frame member moves relative to the fixed frame member,
 wherein the lock tab has a first orientation in which the first end contacts the slide surface and the second end is outside the path and a second orientation in which the first end contacts the stop surface and the second end is outside the path and a third orientation in which the first end is spaced from the movable frame member and the second end is in the path, and
 wherein the lock tab is configured such that moving the movable frame member in the first direction from a first position to a second position causes the lock tab to move from the first orientation to the second orientation and moving the movable frame member from a third position to a fourth position causes the body to contact the first cam surface and shift the lock tab from the second orientation to the third orientation, and moving the movable frame member from the third position to the first position causes the body to contact the second cam surface and shift the lock tab from the third orientation to the first orientation.

8. The apparatus according to claim 7,
 including holding means for releasably holding the lock tab in the third orientation.

9. The apparatus according to claim 8,
 wherein the lock tab is configured to be shifted from the first orientation to the second orientation by gravity.

10. The apparatus according to claim 9,
 wherein the body includes a plate projecting from the movable frame member.

11. The apparatus according to claim 10
 wherein the first cam surface and the second cam surface are formed on a concave side of the lock tab.

12. The apparatus according to claim 10,
 wherein the holding means comprises a permanent magnet.

13. The apparatus according to claim 7,
 wherein the lock tab is configured to support a weight of the movable frame member when the lock tab is in the second orientation.

14. A method of operating the apparatus according to claim 7, the method comprising:
 reciprocating the movable frame member relative to the fixed frame member with the lock tab in the first orientation such that the contact surface slides on the slide surface in the second direction from a first location to a second location and in the first direction from the second location to the first location;
 with the contact surface at the second location, moving the movable frame member in the first direction until an end of the slide surface moves past the first end of the lock tab such that the lock tab shifts to the second orientation, and
 moving the movable frame member in the second direction until the movable frame member is supported by the lock tab.

15. The method according to claim 14, including:
moving the movable frame member in the first direction until the body contacts the first cam surface and shifts the lock tab into the third orientation.

16. The method according to claim 15, including:
moving the movable frame member in the second direction such that the body contacts the second cam surface and shifts the lock tab from the third orientation to the first orientation.

17. A lockout device for selectively blocking linear movement of a movable frame member relative to a fixed frame member, the lockout device comprising:
a lock tab pivotably mountable to the fixed frame member adjacent to the movable frame member and having a contact surface configured to slidably engage a slide surface of the movable frame member when the lock tab has a first orientation, the movable frame member including a stop surface at one end of the slide surface;
holding means for releasably holding the lock tab in a second orientation with the contact surface spaced from the slide surface; and
a body mountable to the movable frame member and configured such that movement of the movable frame member in a first direction relative to the fixed frame member causes the body to contact a first portion of the lock tab and push the lock tab into the second orientation and movement of the movable member in a second direction relative to the fixed frame member causes the body to contact a second portion of the lock tab and pivot the lock tab into the first orientation,
wherein the lock tab is movable independently of the holding means, and
wherein the lock tab is shiftable to a third orientation in which the contact surface engages the stop surface.

18. The lockout device according to claim 17,
wherein the holding means comprises a permanent magnet.

19. The lockout device according to claim 17,
wherein a first portion of the lock tab is spaced from the holding means in the first orientation, and
wherein the first portion of the lock tab contacts the holding means in the second orientation.

20. The lockout device according to claim 19,
wherein the holding means comprises a permanent magnet.

* * * * *